United States Patent [19]

Ozawa

[11] Patent Number: 5,390,151
[45] Date of Patent: Feb. 14, 1995

[54] METHOD AND DEVICE FOR MEASURING THE CENTER OF ROTATION OF A ROTATING SHAFT

[75] Inventor: Norimitsu Ozawa, Tsuchiura, Japan

[73] Assignees: Agency of Industrial Science & Technology; Ministry of International Trade & Industry, Tokyo, Japan

[21] Appl. No.: 37,553

[22] Filed: Mar. 24, 1993

[30] Foreign Application Priority Data

Mar. 27, 1992 [JP] Japan .................... 4-101988

[51] Int. Cl.$^6$ .................... G01B 11/10
[52] U.S. Cl. .................... 356/426; 250/231.17
[58] Field of Search .................... 356/426, 368, 350; 250/227.3, 227.32, 231.18, 231.17, 231.16

[56] References Cited

U.S. PATENT DOCUMENTS

| | | | |
|---|---|---|---|
| 3,836,929 | 9/1974 | White | 342/427 |
| 4,845,503 | 7/1989 | Adam et al. | 342/448 |
| 5,050,618 | 9/1991 | Larsen | 128/774 |

FOREIGN PATENT DOCUMENTS 0299209 10/1992 Japan .

*Primary Examiner*—Rolf Hille
*Assistant Examiner*—Alexander Williams
*Attorney, Agent, or Firm*—Oblon, Spivak, McClelland, Maier & Neustadt

[57] ABSTRACT

Three non-contact type displacement sensors are positioned at the vertices of an equilateral triangle and disposed in opposition to an optical flat attached to the tip of a rotating shaft, while the optical flat is rotated at a slight tilt away from parallel. Undulation components synchronized with the rotation are detected from among signals indicating the relative displacement between the optical flat and displacement sensors during rotation, and the individual phase differences are found for two adjacent displacement sensors among the three synchronized components. As a result, three circles can be drawn through the positions of the centers of (two) adjacent displacement sensors, and the position of the center of rotation of the shaft coincides with the coordinates of the point of intersection of the three circles. Using a high-speed calculating device that finds the equations of two circles and their points of intersection from the output of the phase-difference detector, a display that displays the points of intersection of the circles, namely the coordinate position of the center of rotation, and hard-copy printers and the like, the position of the center of rotation can be detected quickly and automatically, displayed and provided as output.

4 Claims, 4 Drawing Sheets

METHOD AND DEVICE FOR MEASURING THE CENTER OF ROTATION OF A ROTATING SHAFT

BACKGROUND OF THE INVENTION

1. Field of the Invention

This invention relates to a method for automatically detecting the position of the center of rotation of a rotating shaft by means of an optical flat and three sensors positioned in opposition to said optical flat.

2. Prior Art Statement

The position of the center of rotation of a rotating shaft fluctuates depending on the construction of the shaft and its bearings, speed of rotation, external forces that act on the shaft, and the like. In particular, the main spindle of a machine tool rotates while holding tools or work pieces of various shapes and weights as the machining is performed, and fluctuations directly affect the results of machining (dimensional accuracy, shape of the machined surface, etc.). Accordingly, the main spindle system must be designed such that the shaft-center fluctuations are kept to a level that is tolerable with respect to the required machining accuracy. In addition, during a precision turning operation, aligning the height of the tool tip to the position of the center of rotation with a high precision is a serious technical problem. In order to address this problem, a method for detecting the position of the center of rotation of a spindle, during unloaded rotation and during rotation while machining, at a high accuracy on the sub-micron or nanometer order must be established.

As a technique for detecting the center of rotation of a rotating shaft, the inventor of the present invention has previously proposed a method that uses a steel ball to measure the position of the center of rotation (Japanese Patent Application Public Disclosure No. 4(1992)-299209).

In this technique for measuring the position of the center of rotation using a steel ball, a steel ball is attached to the end face of the rotating shaft, and the axial displacement of the steel ball is measured during rotation of the rotating shaft. The position at which the component of the displacement signal that is synchronized with the rotation is minimized is determined to be the center of rotation.

However, in the prior art described above, the undulation components synchronized with the rotation become extremely small near the center of rotation. So, in order to find the position of the center to a high precision, high-precision guide and drive mechanisms must be used to scan a displacement sensor in two dimensions in order to find the minimum value of the undulation component synchronized with the rotation, thus requiring advanced measurement techniques. Such techniques have made the measurement device complex and expensive.

The present invention came about in light of the above, and its purpose is to provide a method and device for automatically detecting the measurable position of the center of rotation of a rotating shaft to a high precision without requiring advanced measurement techniques or complex measurement devices.

SUMMARY OF THE INVENTION

In order to achieve this purpose, the method of measuring the position of the center of rotation of a rotating shaft according to the present invention comprises the steps of: attaching, via a goniometer, an optical flat to the end face of a rotating shaft, disposing within a plane facing the optical flat three non-contact type displacement sensors positioned at the vertices of an equilateral triangle, rotating said optical flat at a slight tilt to detect relative displacements from said optical flat with said three non-contact type displacement sensors, detecting from the relative displacements phase differences of signal components that are synchronized with the rotation of said optical flat, and inputting said phase differences and the positions of said three displacement sensors to a computer to find the position of the center of rotation of the rotating shaft.

Furthermore, the device for measuring the position of the center of rotation of a rotating shaft according to the present invention comprises: an optical flat attached via a goniometer to the tip of a rotating shaft of which one is attempting to detect the position of its center, three non-contact type displacement sensors positioned at the vertices of an equilateral triangle and disposed within a plane in opposition to the optical flat, phase-difference detection means that detects, among the relative displacements from said optical flat detected by said three non-contact displacement sensors, at least the phase differences of those signal components that are synchronized to rotation, and calculating means that accepts phase-difference signals from said phase-difference detection means and positions of vertices of said equilateral triangle as input signals, and calculates the position of the center of rotation of said rotating shaft.

The three non-contact type displacement sensors detect relative displacements from the optical flat during rotation, and after these output signals are amplified and filtered by an amplifier/filter, they are provided as input to a phase-difference detector that detects the phase difference of the undulation component synchronized with the rotation of the aforementioned relative displacements. This phase difference and the position of the detector are provided as input to a computing device that finds the equations of two circles, and calculates the coordinates of the point where the two circles intersect (the position of the center of rotation), which is displayed on a two-dimensional display or other output device.

As described above, the present invention has three displacement sensors each positioned at a vertex of an equilateral triangle, so as long as the position of the center of the rotating shaft to be measured lies within this equilateral triangle, and the optical flat is rotated at a slight tilt away from parallel, the position of the center of a rotating shaft can be detected at high precision without the need for advanced measurement techniques or complex and expensive measurement devices.

These and other objects and features of the present invention will become more apparent from the following detailed description taken in conjunction with the accompanying drawings.

DETAILED DESCRIPTION OF THE PREFERRED EMBODIMENT

Here follows a description of one preferred embodiment of the present invention made with reference to drawings.

Figure 1:
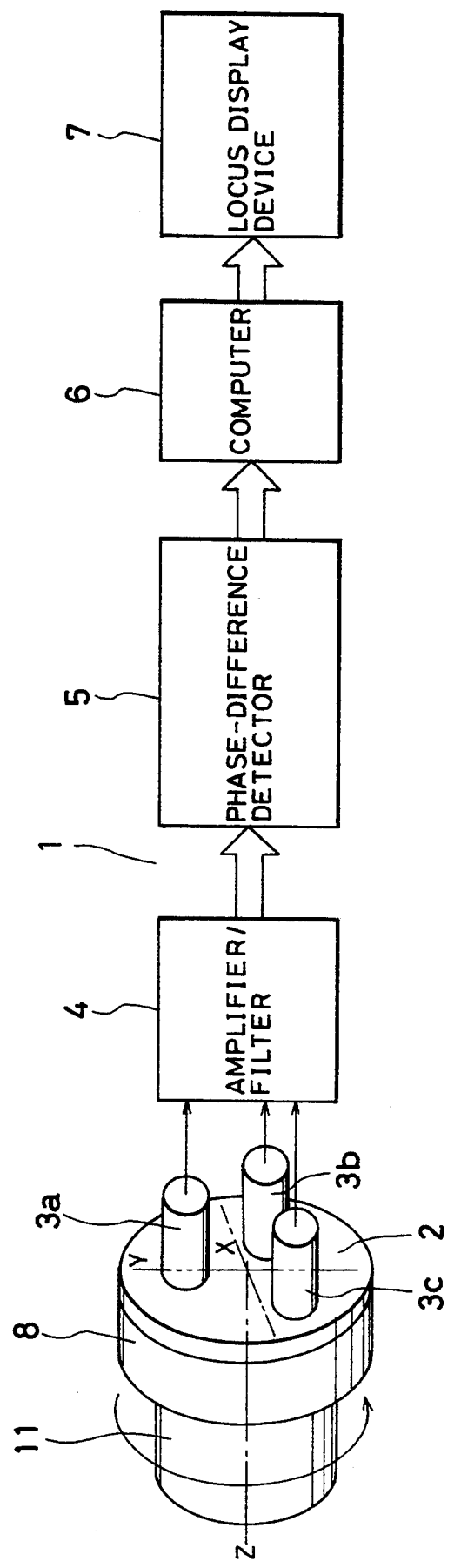
FIG. 1 is an explanatory diagram that shows the structure of the device for detecting the position of the center of rotation of a rotating shaft according to the present invention.

FIG. 1 shows the device for detecting the position of the center of rotation of a rotating shaft according to the present invention. The device for detecting the position of the center of rotation of a rotating shaft 1 is provided with an optical flat 2, three non-contact displacement sensors 3a, 3b, and 3b, an amplifier/filter 4, a phase-difference detector 5, a high-speed calculating device (computer) 6, and a locus display device 7.

The optical flat 2 is a disk of quartz or optical glass that has a high degree of flatness. A goniometer 8 is chucked to the end of the rotating shaft to be measured, and the optical flat 2 is attached to the goniometer 8 by adhesive.

Figure 2:
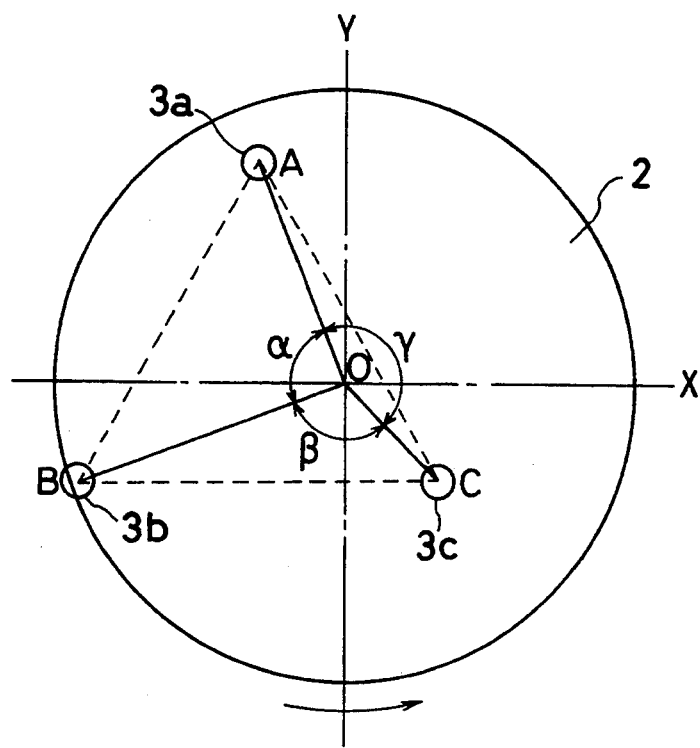
FIG. 2 is an explanatory diagram that shows the relationship between the positions of the non-contact displacement sensors and the position of the center of rotation in the XY plane of the device in FIG. 1.
Figure 3:
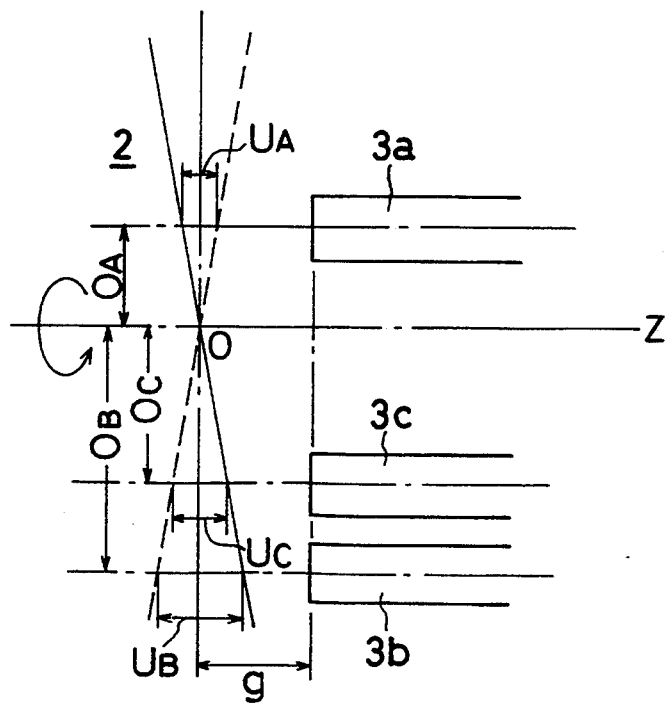
FIG. 3 is an explanatory diagram that shows the relationships between the optical flat and the positions of the non-contact displacement sensors, along with the undulation components synchronized with the rotation.

As shown in FIGS. 2 and 3, the three non-contact displacement sensors 3a, 3b, and 3b are disposed such that the position of the center of each of the non-contact displacement sensors 3a, 3b, and 3b lies at one of the vertices A, B, and C of an equilateral triangle in the XY plane, and are opposed to the optical flat 2 with a gap of roughly 0.1–0.5 mm in the Z direction. The non-contact displacement sensors used in the present invention may be any electronic capacitance type transducer that can measure displacement with extremely high precision. Note that the means of support for the three non-contact displacement sensors is omitted from the drawing.

The amplifier/filter 4 amplifies and filters the output signals from the non-contact displacement sensors 3a, 3b, and 3b.

The phase-difference detector 5 detects the phase difference of the signal components that are synchronized with rotation from among all of the relative displacements of the optical flat 2 detected in the Z-axis direction by the three non-contact displacement sensors 3a, 3b, and 3b.

The high-speed calculating device 6 finds the equations of two circles from phase-difference signals $\alpha$, $\beta$, and $\gamma$ from the phase-difference detector 5 and the coordinates of the vertices A, B, and C of the equilateral triangle.

The locus display device 7 displays the points of intersection of the circles (the coordinate positions of the center of rotation) found by the high-speed calculating device 6.

The principle and procedure by which the position of the center of rotation of a rotating shaft is derived are given below.

(1) Arrangement of Displacement Sensors and Range of Measurement

As shown in FIG. 2, the three non-contact displacement sensors 3a, 3b, and 3c are disposed in the XY plane such that the position of the centers of the displacement sensors lie at the vertices (A, B, and C) of an equilateral triangle. The position O of the center of rotation to be detected does not normally coincide with the position of the geometrical center of the triangle $\Delta ABC$, so the case in which they are not aligned as shown in FIG. 2 is normal. However, the three displacement sensors are arranged such that at least the position O of the center of rotation falls within the interior of $\Delta ABC$. Accordingly, if the vertical angles of the triangles $\Delta ABO$, $\Delta BCO$ and $\Delta CAO$ formed by the position O of the center of rotation and the positions of the centers of two adjacent displacement sensors have angles $<ABO = \alpha$
$<BCO = \beta$
$<CAO = \gamma$ then for O to lie within the interior of $\Delta ABC$, $\alpha$, $\beta$ and $\gamma$ must each be less than 180°. In addition, the diameter of the high-precision optical flat 2 must be significantly larger than the diameter of the circle circumscribed around $\Delta ABC$.

FIG. 3 shows such an arrangement when viewed from the X direction of FIG. 2. To describe this device in specific detail, first, the optical flat 2 is adjusted in advance such that it is orthogonal (in the direction OA) to axis Z of the axis of rotation 11. Next, the three displacement sensors 3a, 3b, and 3c are arranged at the vertices of an equilateral triangle, and the position of each displacement sensor in the Z direction is adjusted such that an identical gap is formed with respect to the optical flat 2. Finally, the goniometer 8 is used to give a slight tilt to the optical flat 2 with respect to the Z axis. FIG. 3 shows the state of the optical flat 2 being slightly tilted as described above, and the undulation components synchronized with the rotation $U_A$, $U_B$, and $U_C$ of each of the displacement sensors are as shown in the figure. The angle of tilting of the optical flat is 1° or less.

Figure 4:
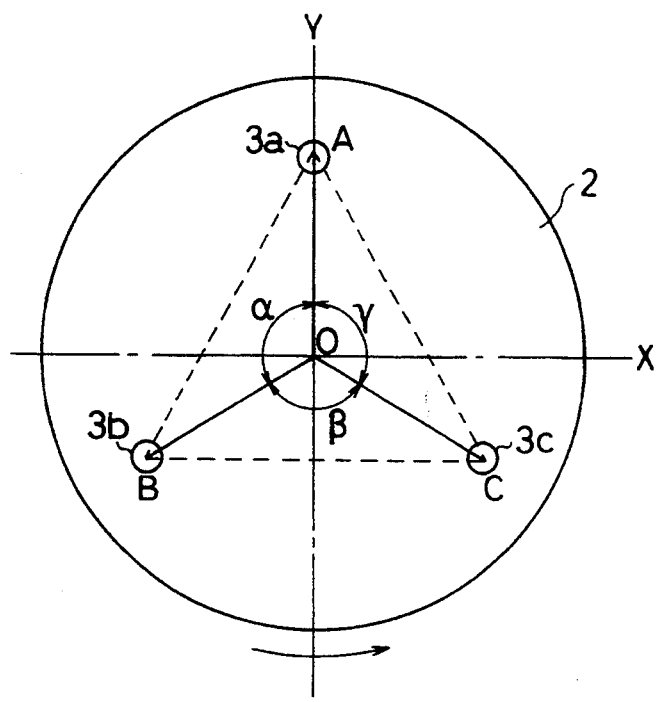
FIG. 4 is an explanatory diagram showing the case in which the center of the equilateral triangle formed by the three non-contact displacement sensors coincides with the center of rotation of the rotating shaft.
Figure 5:
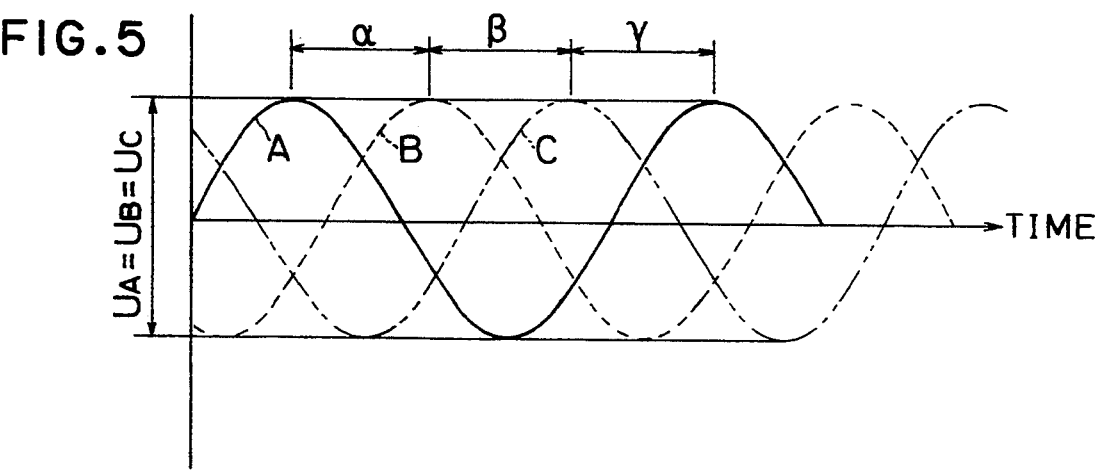
FIG. 5 is a graph showing the rotation-synchronized signals detected by the three displacement sensors in the case that the two centers of FIG. 4 coincide.

(2) Positional Relationship Between the Position O of the Center of Rotation and $\Delta ABC$, and the Undulation Components Synchronized with the Rotation As shown in FIG. 4, in the case in which the positions of both centers coincide completely, the component U of the relative displacement signal between the optical flat and the displacement sensors that is synchronized with the rotation is the signal shown in FIG. 5.

Namely, the distances from the position O of the center of rotation to each displacement sensor are all the same distance, so the undulation components synchronized with the rotation U have the relationship $U_A = U_B = U_c$ and are thus equal. The phase difference of the U components between adjacent displacement sensors is equal to the vertical angles of an equilateral triangle, and thus the relationship $\alpha = \beta = \gamma = 120°$ is true.

In the case when the position O of the center of rotation coincides with the center of $\triangle ABC$, this being the typical case, the distances from the position O of the center of rotation to each of the displacement sensors are not equal. For example, as in FIG. 2, if the center of displacement sensor 3b is the farthest from the center position, displacement sensor 3a is next farthest, and displacement sensor 3c is closest, the distances have the relationship

Figure 6:
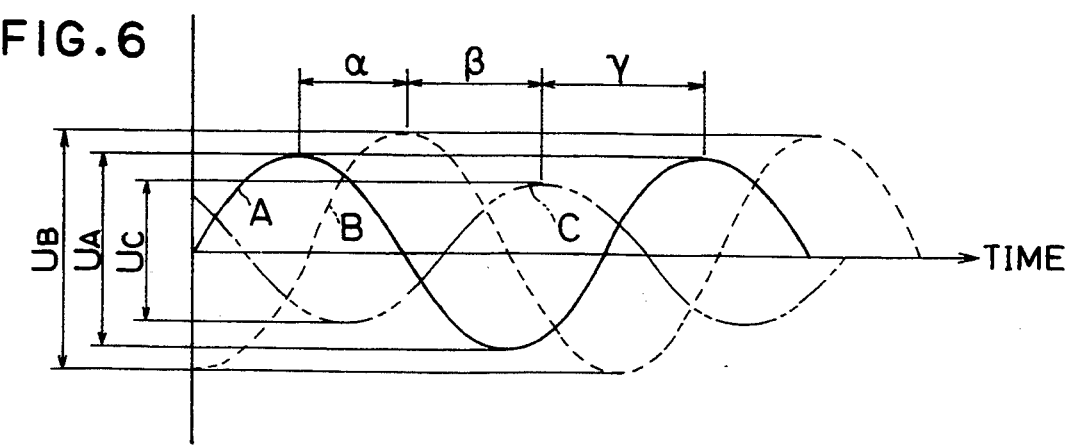
FIG. 6 is a graph showing the rotation-synchronized signals detected by the three displacement sensors in the case that the two centers do not coincide.

OB>OA>OC so the size of the undulation components synchronized with the rotation U have the relationship $U_B > U_A > U_C$ and moreover the phase difference between undulation components synchronized with the rotation have the relationship $\alpha > \beta < \gamma$ so the undulation components synchronized with the rotation U detected at each displacement sensor have the relationship shown in FIG. 6.

(3) Calculation of the Position O of the Center of Rotation

Figure 7:
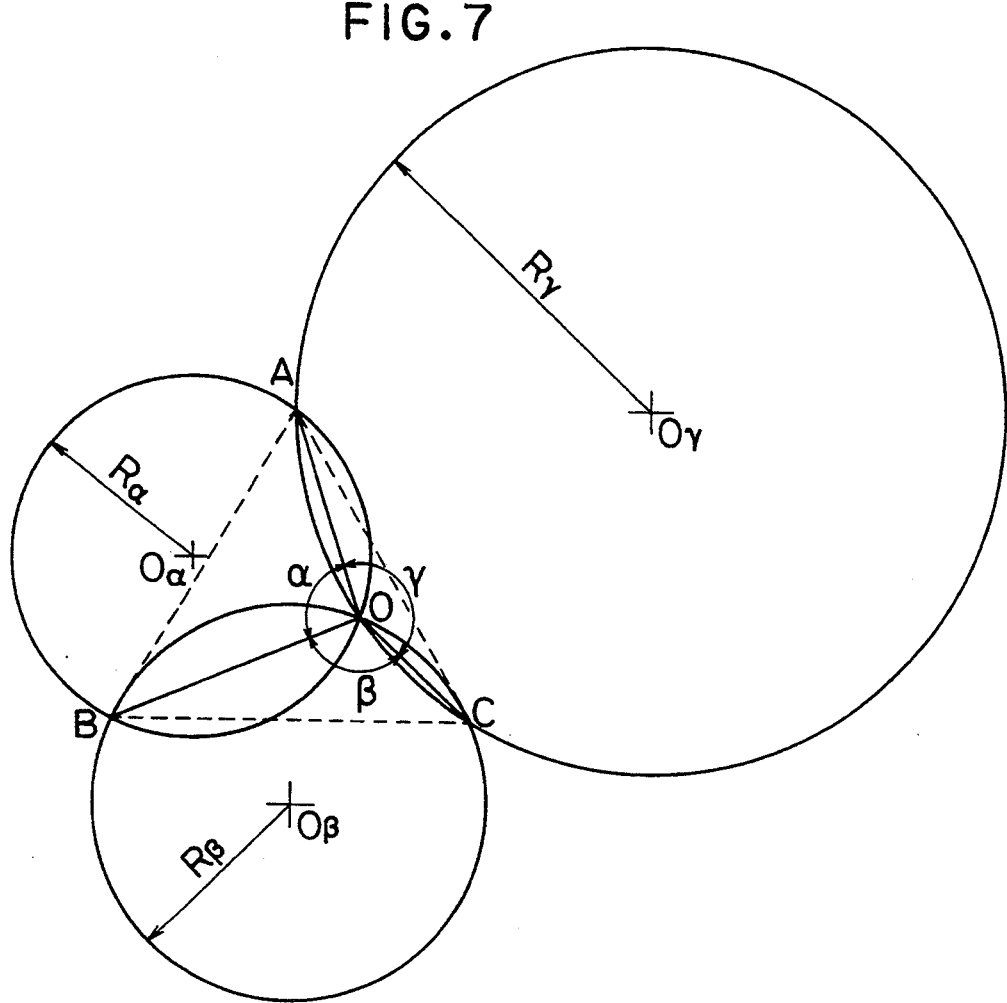
FIG. 7 is an explanatory diagram showing the circles whose centers pass through the centers of two sensors with the phase difference appearing as the inscribed angle.
Figure 8:
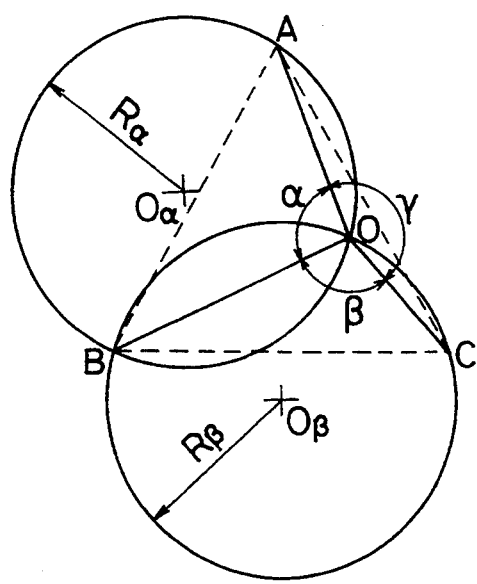
FIG. 8 is an explanatory diagram showing the method of calculating the center of rotation from the coordinate positions of the non-contact displacement sensors and the two phase-difference signals.

As shown in FIG. 7, from the phase difference data for the undulation components synchronized with the rotation U given above, assuming inscribed angles of $\alpha$, $\beta$, and $\gamma$, the circles $O_\alpha$, $O_\beta$, and $O_\gamma$ can be drawn to pass through two of the three points A, B and C. The position of the point of intersection of these three circles coincides with the position O of the center of rotation.

Accordingly, given the coordinate positions of A, B, and C in the XY plane, the coordinate position of the points of intersection of the two circles $O_\alpha$ and $O_\beta$ can be calculated, and the point that does not coincide with the coordinate position of A, B, or C (in this case, B) is the coordinates of the center of rotation.

In the process performed in an actual circuit, the difference in relative displacement between the optical flat and the non-contact displacement sensor is minute at roughly 0.01–1.0 $\mu$m, so the amplifier/filter 4 is used to amplify the signals from the three displacement sensors, and only the undulation components synchronized with the rotation are extracted. The phase-difference detector 5 calculates the phase differences $\alpha$, $\beta$ and $\gamma$ between these undulation components synchronized with the rotation.

(4) Procedure Used by the Calculating Device 6 to Calculate the Position of the Center of Rotation (XY Coordinates of O)

(1) Input XY coordinate data for the three points A, B, and C.

(2) Input the phase differences $\alpha$, $\beta$, and $\gamma$ for the undulation components synchronized with the rotation $U_A$, $U_B$, and $U_C$ at a certain point in time.

(3) Determine whether $\alpha$, $\beta$, and $\gamma$ are less than 180°.

(4) If any of $\alpha$, $\beta$, or $\gamma$ is greater than 180°, move the three displacement sensors in the X and/or Y direction, and start over from (1).

(5) When each of $\alpha$, $\beta$, and $\gamma$ is less than 180°, calculate the XY coordinates of the center $O_\alpha$ of the circle passing through points A and B with the inscribed angle $\alpha$, and its radius $R_\alpha$.

(6) In the same manner, calculate the XY coordinates of the center $O_\beta$ of the circle passing through points B and C with the inscribed angle $\beta$, and its radius $R_\beta$.

(7) Calculate the XY coordinates of the two points of intersection of these two circles.

(8) Determine whether or not the coordinates of the two points of intersection coincide with the coordinates of point B.

(9) Display and output the coordinates of the point that does not coincide (the coordinates of the position of the center of rotation).

Thus, by means of the present invention, automatic, high-speed detection of the position of the center of rotation becomes possible, so that one can view, in real-time, fluctuations in the locus of coordinate positions of the center of rotation of a main spindle due to machining forces during machining, vibration, external forces and the like. It also becomes possible to control tool positions based on coordinate position signal output. Moreover, in-process measurement of the stiffness of main spindle can be performed based on the machining force and fluctuations of the center position. Since it can be used for the measurement of the main spindles of ultra-high precision machine tools, measurement of the position of the center of rotation of a main spindle can be performed at higher precision and measurement can be performed more easily. As a result, the elastic deformation of the main spindle due to cutting forces in a machine tool or the like can be found directly, thus producing valuable data for main-spindle design.

In the conventional technique for detecting the center of rotation using a steel ball, the undulation components synchronized with the rotation become extremely weak signal components near the center of rotation. So in order to find the position of the center to a high precision, high-precision guide and drive mechanisms must be used to scan a displacement sensor in two dimensions in order to measure the minimum values of the undulation components synchronized with the rotation.

However, in the present invention, as long as the position of the center of rotation of a rotating shaft falls within the interior of the equilateral triangle formed by connecting the positions of the centers of the three displacement sensors, this sort of scanning is not needed, the position of the center of rotation can be calculated using a high-speed calculating circuit, and moreover, changes in the locus of positions of the center of rotation can be followed at high speed.

Obviously, numerous modifications and variations of the present invention are possible in light of the above teachings. It is therefore to be understood that within the scope of the appended claims, the invention may be practiced otherwise than as specifically described herein.

What is claimed is:

1. A method of measuring a position of a center of rotation of a rotating shaft, comprising the steps of:

using a goniometer to attach an optical flat to an end face of the rotating shaft, the position of the center of rotation of which is to be measured;

positioning three non-contact type displacement sensors positioned at vertices of an equilateral triangle and disposing the sensors within a plane facing the optical flat;

slightly tilting the optical flat relative to an axis of the rotating shaft and rotating the rotating shaft and the tilted optical flat together;

using the three non-contact type displacement sensors to detect from relative displacements phase differences of signal components that are synchronized with the rotation of the optical flat; and inputting said phase differences and the positions of said three displacement sensors to a computer to find the position of the center of rotation of the rotating shaft.

2. A device for measuring a position of a center of rotation of a rotating shaft comprising:

an optical flat attached to an end face of the rotating shaft at a slight tilt relative to an axis of the rotating shaft using a goniometer;

three non-contact type displacement sensors positioned at vertices of an equilateral triangle and disposed within a plane facing the optical flat for detecting relative displacements from the optical flat;

phase-difference detection means for detecting from the relative displacements phase differences of signal components that are synchronized with rotation of said optical flat; and a computer for accepting the phase differences from the phase-difference detection means and the positions of the three displacement sensors as input signals and calculating the position of the center of rotation of the rotating shaft.

3. A device for determining a position of a center of rotation of a rotating shaft, comprising:

an optical flat disposed on an end of the rotating shaft where the center of rotation is to be determined, the optical flat having a flat major surface which is sloped not more than one degree with respect to a cross section of the rotating shaft;

three non-contact type displacement sensors arranged at vertices of an equilateral triangle such that each of said sensors is disposed at each of the vertices, the sensors being stationary and adjacent, but not in contact, to the optical flat;

phase-difference detection means electrically connected to the sensors for determining phase differences between sinusoidal undulations detected by the sensors, the sinusoidal undulations corresponding to an oscillating distance between the flat major surface and each of the sensors; and computing means electrically connected to the phase-difference detection means for determining the position of the center of rotation by computationally constructing at least two circles, each circle intersecting two of the equilateral triangle vertices such that a first line drawn from a first intersected vertex to a point on the circumference of the circle and a second line drawn from a second intersected vertex to the same point on the circumference forms an angle between the first and the second lines equal to one of said phase differences, an intersection point of said two circles which is not a vertex of said equilateral triangle being the center of rotation of the rotating shaft.

4. The device according to claim 3, wherein a distance between the optical flat and each of the sensors is in the range of 0.1 to 0.5 mm.

* * * * *